Patented July 6, 1948

2,444,555

UNITED STATES PATENT OFFICE 2,444,555

HEAT TRANSFER MEDIA

William Herbert Daudt, Corning, N. Y., assignor to Corning Glass Works, Corning, N. Y., a corporation of New York No Drawing. Application September 5, 1945, Serial No. 614,609

4 Claims. (Cl. 252—78)

This invention relates to new compositions of matter and, more particularly, to organo-disiloxanes and their use as high temperature heat transfer media.

The primary object of this invention is to provide a composition which can be used in processes for transmitting heat to fluids in indirect contact with heat transmitting material. Another object of the present invention is to provide a heat transfer medium which is liquid over a wide temperature range and which remains substantially unchanged when exposed to air at elevated temperature for prolonged periods of time. A still further object is to provide a heat transfer medium which is liquid over a range of 300° C. and which has a boiling point above 300° C. Further objects and advantages of my invention will be apparent from the following description and claims.

Hexaphenyldisiloxane, [$(C_6H_5)_3Si]_2O$ is a high melting crystalline compound which has been described in the literature. For an organic compound, it is found to possess unusual stability when heated in the neighborhood of 400° C. and to resist oxidation from contact with air even at 300° C. It is prepared economically from readily available intermediates having the general formula $(C_6H_5)_3SiX$, where X may be a hydroxyl, ethoxyl, chlorine or some other readily hydrolyzable atom or group. However, its relatively high melting point (225° C.) renders it unsuitable for use in heat transfer equipment. It would be desirable to provide a material with comparable stability and similar properties, except with a freezing point well below 100° C.

I have found that compositions with the desired properties can be prepared. These compositions have the following general structural formula—

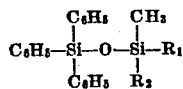

where $R_1$ and $R_2$ are organic radicals selected from the class consisting of phenyl and methyl radicals. There are three compounds included within the scope of the above general formula. They are (1) $(C_6H_5)_3SiOSi(CH_3)_3$,
(2) $(C_6H_5)_3SiOSi(C_6H_5)(CH_3)_2$, and
(3) $(C_6H_5)_3SiOSi(C_6H_5)_2(CH_3)$.

They all melt below 100° C. and boil above 300° C. at atmospheric pressure. They all remain substantially unchanged when heated at 300° C. and higher. Furthermore, one of the intermediates utilized in their manufacture is the readily available composition $(C_6H_5)_3SiX$ referred to above.

The following examples illustrate methods of preparing the disiloxanes of this invention and also give the specific properties of each disiloxane which makes it suitable for use as a high temperature heat transfer medium.

Example 1

To 400 parts by weight of ethoxytrimethylsilane (B. P. 74°/740 mm.) were added 28 parts by weight of recrystallized triphenylsilanol M. P. 150–151° C. Hydrochloric acid was added as a condensation catalyst. The silanol crystals slowly disappeared and heat was evolved as the reaction took place. When the reaction had ceased, an excess of water was added to the reaction products. The upper organic layer was separated and washed with dilute potassium carbonate and then with water to remove acid and alcohol. The by-product hexamethyldisiloxane, B. P. 98–99° C., was removed by distillation at atmospheric pressure and the residue was then distilled at 230–235° C. and 26–27 mm. pressure. On cooling, the distillate crystallized to a dry powder which was soluble in petroleum ether and had a melting point of 49.5–51.0° C. Analysis showed that this powder was 1,1,1-trimethyltriphenyldisiloxane, $(CH_3)_3Si-O-Si(C_6H_5)_3$. Its boiling point at atmospheric pressure is 350° C.

Example 2

To 1 mole (180.3 g.) of ethoxydimethylphenylsilane was added 1 g. of 50% aqueous sodium hydroxide for a condensation catalyst. The alkaline mixture was next warmed to 110° C. and to it was then added a total of 0.200 mole (55.24 g.) of triphenylsilanol (M. P. 149.5–151° C.) in 0.3 to 0.5 g. portions. Ethanol was a reaction product and distilled continuously during the addition, which was carried out in about 2 hours. After heating the mixture for an additional one-half hour at 110–115° C., ½ mole (8 g.) of water was introduced and ethanol then distilled rapidly as the excess ethoxysilane was hydrolyzed. The mixture was heated overnight at 90–115° to drive off solvent and allow the condensation to go to completion. The concentrated product was then taken into ether and neutralized with dilute acetic acid. After filtering the mixture to remove the by-product hexaphenyldisiloxane, the ether solution was separated from the aqueous layer and washed to neutrality and concentrated. Fractional distillation gave 80 g. of the liquid disiloxane [C₆H₅(CH₃)₂Si]₂O (B. P. 290–295° at 737 mm.) and 37.7 g. of a higher boiling (230–232°/4 mm.) product which crystallized on standing. The latter product, recrystallized from ethanol-ethyl acetate, has a melting point of 49.0–49.5° C. and a boiling point of 415° C. at 744 mm. Its composition was shown by analysis to be 1,1-dimethyltetraphenyldisiloxane, (C₆H₅)₃SiOSi(CH₃)₂C₆H₅.

*Example 3*

A mixture of 31.3 parts by weight of ethoxytriphenylsilane (M. P. 61.7–62.5°) and 98.14 parts by weight of ethoxymethyldiphenylsilane (B. P. 105°/1 mm.) was cohydrolyzed and condensed by treating with excess aqueous ethanol (12.2 parts by weight of H₂O and approximately 150 parts of 95% ethanol) containing alkali as catalyst (0.24 parts by weight of NaOH). After refluxing the two-phase mixture overnight, most of the alcohol was distilled and a homogeneous solution obtained which was then heated 6 hours longer at 80–85°. Water was next added and the mixture was allowed to stand. The siloxane phase was then taken into ether, washed with dilute acid and water, concentrated and distilled at 3 mm. Most of the distillate came over at 200–300°/3 mm.; from it crystallized 5.5 g. of a new compound, melting at 75–76°, which was shown by analysis to be methylpentaphenyldisiloxane, (C₆H₅)₃SiOSi(C₆H₅)₂CH₃. An additional 6 g. of this material was isolated from the still-pot residue.

Methylpentaphenyldisiloxane has also been isolated as a product of the condensation of chloromethyldiphenylsilane and triphenylsilanol.

The above compounds, as previously stated, are resistant to oxidation at elevated temperatures. When air is blown through them for many hours at temperatures above 200° C., they remain substantially unchanged. For example, dry air was allowed to pass in a fine steady stream through a 4.0 g. sample of melted (C₆H₅)₃SiOSi(CH₃)₃ at 260° C. for 120 hours. Its viscosity did not change and its silicon content was found to remain the same (16.1%). Thus the disiloxane withstands drastic treatment with air at elevated temperatures.

In some cases it may be desirable to employ stable high boiling heat transfer media which have lower melting points than the pure compounds of the present invention. Homogeneous liquid compositions with freezing points below 30° C. may be obtained by mixing at least two of said compounds. Or, if desired, one or more of these compounds may be mixed with other high-boiling disiloxanes, such as symmetrical dimethyltetraphenyldisiloxane. For example, when the disiloxanes (C₆H₅)₃SiOSi(CH₃)₃ and

[(C₆H₅)₂CH₃]₂O are mixed in the respective molar ratio of 53/47, a eutectic mixture having a melting point of 25° C. is obtained.

The compounds of this invention may also be employed in mixture with biphenyl, diphenyl ether, certain organo-cyclosiloxanes and other materials with which they are compatible and which are commonly employed by themselves for heat transfer.

I claim:

1. In a process for transmitting heat to fluids in indirect contact with heat transmitting material, the step of employing as the heat transmitting material a composition having the general formula—

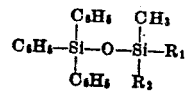

where R₁ and R₂ are organic radicals selected from the class consisting of phenyl and methyl radicals.

2. In a process for transmitting heat to fluids in indirect contact with heat transmitting material, the step of employing as the heat transmitting material a composition having the general formula—

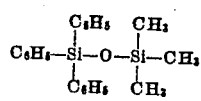

3. In a process for transmitting heat to fluids in indirect contact with heat transmitting material, the step of employing as the heat transmitting material a composition having the general formula—

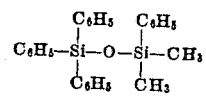

4. In a process for transmitting heat to fluids in indirect contact with heat transmitting material, the step of employing as the heat transmitting material a composition having the general formula—

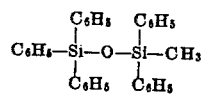

WILLIAM HERBERT DAUDT.

REFERENCES CITED

The following references are of record in the file of this patent:

UNITED STATES PATENTS

| Number | Name | Date |
|---|---|---|
| 2,030,739 | Bley | Feb. 11, 1936 |
| 2,212,992 | Sowa | Aug. 27, 1940 |
| 2,258,218 | Rochaw | Oct. 7, 1941 |
| 2,335,012 | Johnson | Nov. 23, 1943 |
| 2,384,384 | McGregor et al. | Sept. 4, 1945 |
| 2,389,802 | McGregor et al. | Nov. 27, 1945 |
| 2,398,187 | McGregor et al. | Apr. 9, 1946 |
| 2,390,518 | Daudt | Dec. 11, 1945 |

FOREIGN PATENTS

| Number | Country | Date |
|---|---|---|
| 549,081 | Great Britain | Nov. 5, 1942 |

OTHER REFERENCES

Journal Chem. Society (London) vol. 132 (1929) pages 357–8.

Journal Chem. Society (London) vol. 79 (1901) pages 454–6.

Journal Chem. Society (London) vol. 95 (1909) pages 307–8.

Journal Chem. Society (London) vol. 91 (1907) pages 210–214.

Journal Chem. Society (London) vol. 99 (1911) pages 140–142.

Journal Chem. Society (London) vol. 93 (1908) pages 199 & 207.

Berichte, vol. 164 (1872), page 300—Ladenburg.